United States Patent [19]

Meadow

[11] Patent Number: 4,557,910

[45] Date of Patent: Dec. 10, 1985

[54] PRODUCTION OF SODA ASH FROM NAHCOLITE

[75] Inventor: Morton Meadow, Trenton, N.J.

[73] Assignee: Intermountain Research & Development Corporation, Green River, Wyo.

[21] Appl. No.: 362,826

[22] Filed: Mar. 29, 1982

[51] Int. Cl.$^4$ .................... C01D 15/08; C01D 7/37; C01D 17/00; C22B 26/10

[52] U.S. Cl. ................. 423/206 T; 423/421; 423/427

[58] Field of Search ................. 423/206 T, 421, 422, 423/426, 427

[56] References Cited

U.S. PATENT DOCUMENTS

| | | | |
|---|---|---|---|
| 2,346,140 | 4/1944 | Pike | 423/189 |
| 2,388,009 | 10/1945 | Pike | 423/206 R |
| 3,113,834 | 12/1963 | Beecher et al. | 423/426 |
| 3,119,655 | 1/1964 | Frint et al. | 423/206 T |
| 3,131,996 | 5/1964 | Seglin et al. | 423/206 R |
| 3,264,057 | 8/1966 | Miller | 423/206 T |
| 3,273,958 | 9/1966 | Peverley | 423/206 T |
| 3,653,848 | 4/1972 | Port et al. | 423/206 T |
| 3,700,280 | 10/1972 | Papadopoulos et al. | 299/5 |
| 3,717,698 | 2/1973 | Ilardi et al. | 423/206 R |
| 3,759,574 | 9/1973 | Reard | 423/206 T |
| 3,779,601 | 12/1973 | Beard | 299/4 |
| 3,779,602 | 12/1973 | Beard et al. | 299/5 |
| 3,821,353 | 6/1974 | Weichman | 423/119 |
| 3,869,538 | 3/1975 | Sproul et al. | 423/206 R |
| 3,953,073 | 4/1976 | Kube | 299/5 |
| 3,956,457 | 5/1976 | Port et al. | 423/206 T |
| 3,962,403 | 6/1976 | Wyslouzil | 423/206 R |
| 3,981,686 | 9/1976 | Lobunez | 423/421 |
| 4,158,043 | 6/1979 | Gloster | 423/206 T |
| 4,202,667 | 5/1980 | Conroy et al. | 23/302 T |
| 4,252,781 | 2/1981 | Fujita et al. | 423/427 |
| 4,283,372 | 8/1981 | Frint et al. | 423/206 T |

*Primary Examiner*—Gary P. Straub
*Attorney, Agent, or Firm*—C. Egolf

[57] ABSTRACT

Soda ash is prepared from dry-mined nahcolite ore by partially calcining the ore, dissolving the ore in aqueous solution, separating the resultant solution from the ore insolubles, crystallizing anhydrous sodium carbonate or sodium carbonate monohydrate, and recovering the crystallized sodium carbonate.

13 Claims, No Drawings

PRODUCTION OF SODA ASH FROM NAHCOLITE

BACKGROUND OF THE INVENTION

1. Field of the Invention:

This invention relates to the production of soda ash (sodium carbonate) from nahcolite (sodium bicarbonate).

2. Description of the Prior Art:

Large deposits of nahcolite (naturally-occurring $NaHCO_3$) and of dawsonite ($NaAl(OH)_2CO_3$) are associated with oil-bearing shale formations located in the Piceance Creek Basin of northwest Colorado. The economics of recovering oil from these oil shale formations are generally more attractive for ventures that contemplate the concurrent recovery of one or more of the associated minerals.

Recovery procedures that are described in the literature for the exploitation of these oil-bearing formations have generally focused on the effective separation and recovery of oil, with little emphasis being given to specific procedures applicable to nahcolite and/or other mineral recovery.

The literature simply suggests that nahcolite can be leached from oil shale ore with aqueous solution or can be recovered by beneficiation as a nahcolite-rich portion of the ore.

U.S. Pat. Nos. 3,700,280, 3,779,601 and 3,779,602 disclose solution mining processes in which the nahcolite portion of the formation is leached, typically with hot water, and the leaching solution then withdrawn from the formation region before the cavity is retorted to recover the oil.

U.S. Pat. No. 3,962,403 is directed to a separation process applicable to dry-mined oil shale ore, in which the ore is first heated to effect a color change in the nahcolite and then an optical sorting technique is employed to efficaceously separate the nahcolite from the oil shale portion of the ore.

Despite general references in the literature to the recovery of nahcolite via dissolution in aqueous solution, there is nevertheless little specific information which describes procedures for recovering nahcolite from such solutions as a useful saleable product.

U.S. Pat. No. 3,113,834, although not concerned with nahcolite, describes a technique for processing crude ammonia-soda process sodium bicarbonate, in an aqueous slurry, into anhydrous dense sodium carbonate via decomposition of the bicarbonate in hot solution. The process is very energy-intensive and does not appear practical for application to nahcolite ore.

The method of the present invention provides a useful procedure for preparing high purity soda ash from nahcolite ore.

SUMMARY OF THE INVENTION

In accordance with the present invention, soda ash is prepared from nahcolite ore by the steps of partially calcining dry-mined, crushed nahcolite ore to convert at least half, but not all, of its bicarbonate content to carbonate; dissolving the soluble portion of the calcine in an aqueous solution to form a carbonate-containing solution admixed with ore insolubles; separating the resultant aqueous solution from the ore insolubles; crystallizing sodium carbonate, selected from the group consisting of sodium carbonate monohydrate and anhydrous sodium carbonate, at elevated temperature; and recovering the crystallized sodium carbonate from the crystallization slurry.

The partial calcination of the nahcolite is desirably carried out under conditions which provide a calciner spill or exit temperature of from 100° to 350° C. and which convert from 50 to 80% of the ore bicarbonate content to carbonate.

Further conversion or decarboxylation of bicarbonate to carbonate, beyond that effected in the partial calcination step, is desirably accomplished via wet calcination in aqueous solution. The aqueous solution employed to dissolve the calcined ore is therefore preferably hot, being maintained at a temperature of at least 65° C. up to the solution boiling point.

Decarboxylation of the bicarbonate to carbonate may also be carried out concurrently with the crystallization step, especially when higher temperatures such as those used for crystallizing the preferred anhydrous sodium carbonate are employed.

DETAILED DESCRIPTION

The nahcolite ore utilized in this invention may be relatively pure, containing more than 80 wt % $NaHCO_3$, or may be oil shale ores that typically contain 30–70 wt % $NaHCO_3$ as nahcolite. The nahcolite ore may also contain sodium carbonate in small or moderate amounts, since such soluble sodium carbonate does not adversely affect the method of this invention. Typically, about 1 wt % $Na_2CO_3$ is present in nahcolite ore.

The nahcolite ore for use in this method is dry-mined by conventional mining techniques, rather than being solution-mined with a mining solvent or fluid.

Relatively pure nahcolite is usally obtained by mining of thick seams or layers of nahcolite that can be found in oil shale ore formations. The less pure nahcolite ore is typically found as crystals disseminated throughout oil shale or interlayered with oil shale.

Nahcolite-bearing ores containing less than 80 wt % $NaHCO_3$, e.g., nahcolite intermixed with oil shale, are preferably beneficiated to separate and recover a nahcolite-rich portion of the ore for further treatment according to the method of this invention.

Regardless of the purity of the nahcolite ore, the drymined ore must be crushed, preferably to form pieces less than 10 cm in size and more preferably, pieces or particles less than 1–2 cm in size. The size reduction operation is not critical, a jaw crusher with a screen to recycle oversized chunks being normally employed. The objective is to provide crushed nahcolite of a particle size that may be readily processed in conventional calcination and dissolution equipment.

The dry-mined, crushed nahcolite ore is partially-calcined to convert a portion of its sodium bicarbonate content to sodium carbonate, at least half but not all of the bicarbonate being converted. The partial calcination is preferably sufficient to convert from 50 to 90%, more preferably 50 to 80% of the ore's sodium bicarbonate content to sodium carbonate. Most preferably, sufficient sodium bicarbonate in the nahcolite is calcined to yield a molar ratio of about 1:1 $NaHCO_3$: $Na_2CO_3$; this is obtained when about 60% of the original bicarbonate in relatively pure nahcolite is converted to carbonate.

The partial calcination may be effected at temperatures ranging from 100° C. to 500° C., but temperatures of from 100° C. to 350° C. are preferred, 125° to 200° C. being most preferred (all measured as the spill or exit temperature of the partially calcined ore). Partial calcination is possible at the higher than preferred temperatures, and even above 500° C., but precise control of the degree of calcination is difficult, and premature pyrolysis or retorting of the oil shale may also occur.

The time required for partial calcination depends on the particular temperature employed, type of calciner equipment, heating means, and on ore particle sizing and bicarbonate content. Times may range from a few seconds (5-15 seconds) to several hours (1-5 hours). Moderately short partial calcination times of from about 5 to 30 minutes are preferable, since these allow the use of reasonable-sized calcination equipment, with short ore residence times, while still permitting precise control of the degree of calcination obtained.

The method of the invention, including the individual operations like the partial calcination, may be operated batchwise or continuously, with continuous operation being preferred.

The partial calcination is desirably carried out in a rotary calciner or fluid bed calciner, but other calciner types may be used. The calciner may be equipped for coal or gas direct firing or may have steam tubes, for the heat source.

The partially calcined nahcolite ore, containing both sodium bicarbonate and sodium carbonate (and other inorganic and organic materials associated with the ore), is then contacted with an aqueous solution to dissolve its soluble components. The aqueous solution may be water, or carbonate-depleted mother liquor from which carbonate values have previously been crystallized, or other available aqueous solution suitable for dissolving sodium carbonate and bicarbonate.

The aqueous solution is preferably hot, e.g., at least 65°-70° C. and preferably 90° C. up to its boiling point, so as to promote dissolution of the sodium carbonate and sodium bicarbonate in the partially calcined ore. The partially calcined ore, if introduced directly from the calciner into the dissolver, also assists in maintaining the desired elevated temperatures in the aqueous dissolving solution.

Dissolution time should be sufficient to dissolve a substantial portion of the soluble sodium carbonate and bicarbonate in the partially calcined nahcolite ore. This may be as short as a few minutes or as long as an hour or more. The dissolving operation may be carried out in one or more stages, as desired.

Pressure during dissolution is preferably atmospheric, but sub- or superatmospheric pressures may also be used.

The aqueous carbonate-containing solution is then separated from the ore insolubles, with which it is admixed. The separation operation, like the dissolution, may be effected in one or more stages, using conventional solids-liquid separation equipment such as settler-thickeners or clarifiers. Filters or centrifuges may also be used, and are preferred for removing residual entrained solids after the bulk of the ore insolubles have been removed in a settler-thickener, clarifier, or the like.

In order to maximize recovery of sodium carbonate (as anhydrous sodium carbonate or sodium carbonate monohydrate), the bicarbonate content of the $Na_2CO_3$-containing solution is desirably minimized, by conversion to carbonate. This may readily be accomplished by maintaining the $NaHCO_3$- and $Na_2CO_3$-aqueous solution at elevated temperature, to result in a wet calcination or decarboxylation of at least some bicarbonate to carbonate. The wet calcination desirably converts, or decarboxylates, sufficient bicarbonate to carbonate so that the solution composition is in a region of the $Na_2CO_3$-$NaHCO_3$-$H_2O$ phase diagram which favors recovery of the desired carbonate species in good yields.

The decarboxylation of bicarbonate is desirably accomplished by maintaining the $Na_2CO_3$-containing aqueous solution at elevated temperature, above 50° C., preferably in excess of 85°-90° C. up to the solution boiling point.

If the dissolution of the nahcolite ore is accomplished using the preferred hot aqueous solution, then the decarboxylation of bicarbonate is promoted by such elevated solution temperatures and no further special measures are required. The same is applicable to the crystallization operation, which desirably is accomplished at elevated temperature and thereby promotes decarboxylation of residual bicarbonate present in the solution.

It should be noted that not all bicarbonate in such aqueous solutions need be converted to sodium carbonate, since both anhydrous and monohydrate species of sodium carbonate can be crystallized from $Na_2CO_3$-containing solutions also containing residual $NaHCO_3$, as reference to a $Na_2CO_3$-$NaHCO_3$-$H_2O$ phase diagram will confirm. In fact, dissolution of nahcolite ore whose bicarbonate content has been at least half calcined will yield an aqueous $Na_2CO_3$-containing solution from which soda ash can be recovered by the method of this invention, despite a moderate level of bicarbonate also present in the solution. However, the presence of moderate amounts of bicarbonate will likely limit the overall yield of soda ash from such solution, and for this reason bicarbonate concentrations are best minimized.

Sodium carbonate, as the monohydrate or anhydrous, is crystallized from the $Na_2CO_3$-containing solution at an elevated temperature, above about 50° C. Crystallization is desirably accomplished by the evaporative removal of water from the carbonate-containing solution.

Anhydrous sodium carbonate is the preferred crystal product, since drying of this crystal product does not require removal of hydrated water. Anhydrous sodium carbonate is crystallized at elevated temperature from solution, above the monohydrate-anhydrous transition temperature. The crystallization is preferably performed at temperatures above 109° C., but lower crystallization temperatures (down to 105° C. or lower) may be employed if additives or impurities that lower the monohydrate-anhydrous transition temperatures are present. The relatively high temperatures employed for crystallization of anhydrous sodium carbonate also promote conversion or decarboxylation of any residual bicarbonate present in the solution.

Sodium carbonate monohydrate may be recovered by evaporative crystallization at elevated temperature, from about 50° C. to 109° C.

After its crystallization, the soda ash product is recovered from the crystallization slurry by conventional methods, e.g., filtration or centrifugation. The crystal product is separated from the crystallizer mother liquor and is dried to yield a free-flowing product. Drying of the soda ash product may be carried out in conventional equipment such as a fluid bed or rotary dryer. When sodium carbonate monohydrate is the recovered soda ash product, it is desirably dried so as to remove the water of hydration as well as free moisture.

The sodium carbonate crystal product that is produced by the method of this invention is characterized by its relatively high purity, in excess of 99% by weight $Na_2CO_3$($H_2O$-free basis).

The crystallizer mother liquor is preferably recycled for further use, so as to fully utilize any residual alkali values contained in such liquor. The mother liquor may be recycled to the crystallization step or may be recycled as aqueous solution for use in the dissolution of additional nahcolite ore, in a repetition of this recovery method.

The method of the invention is further illustrated by the following example, which is not intended to be construed as limiting the invention as claimed.

EXAMPLE

A composite sample of nahcolite ore obtained from Piceance Creek Basin in Colorado was crushed in a jaw crusher for use in this illustrative and comparative example. The composite sample assayed as 99.0% by weight $NaHCO_3$ and 0.5% by weight insolubles. Its particle size distribution was as follows:

7.7 wt %+0.265 in (6.7 mm) Sieve.
45.7 wt %−0.265 in (6.7 mm)+No. 6 (3.35 mm) Sieve
46.6 wt %−No. 6 (3.35 mm) Sieve A portion of the crushed nahcolite ore was partially calcined over a period of three hours in a muffle furnace, through which was passed heated air preheated to a temperature of 170° C. After this partial calcination, the ore was assayed as 41.8 wt % $NaHCO_3$ and 55.3 wt % $Na_2CO_3$.

For comparative purposes, a second portion of the same crushed ore was fully calcined in the same muffle furnace at similar temperature conditions, complete calcination being obtained by calcining the ore to constant weight. After complete calcination, this comparative ore was assayed as 97.6 wt % $Na_2CO_3$, with no $NaHCO_3$ being detected.

The samples of partially and completely calcined nahcolite ore were then processed further to prepare soda ash. The physical characteristics of the two calcined ore samples were evaluated during the subsequent processing steps, which included dissolution in aqueous solution, separation of ore insolubles from the resultant carbonate-containing solution, and crystallization and recovery of anhydrous sodium carbonate.

The calcined ore samples were dissolved (separately) to form aqueous $Na_2CO_3$-containing solutions, by contacting 41 parts by weight ore with 100 parts by weight water at a temperature of 85° C. After sufficient time had been allowed for dissolution of the soluble portion of the ore, the flocculation characteristics of the two slurries were evaluated by measurement of settling rates. These settling tests indicated that the partially calcined ore settled much more rapidly and compactly than the fully calcined ore.

Settling rates were determined by measuring, as a function of time, the volume of settled solids of a slurry sample that had been well-mixed then allowed to settle. The following results were obtained:

| Time (minutes) | 1 | 3 | 5 | 10 | 15 | 20 | 30 | 60 |
|---|---|---|---|---|---|---|---|---|
| Partial Calcine Solids Volume (ml) | 150 | 22 | 18 | 15 | 13 | 13 | 13 | 13 |
| Full Calcine Solids Volume (ml) | — | — | 28 | 26 | 25 | 24 | 22 | 21 |

Volume measurements are not reported for the fully calcined ore at 1 and 3 minutes because poor clarity made precise readings impossible.

Foaming characteristics of the solids-free solutions were also evaluated, since foaming is desirably minimized during evaporative crystallization. After flocculation, the solutions were filtered and 100 ml of filtrate placed in a 250 ml graduated glass cylinder. The filtrate was maintained at constant temperature, the graduate being contained in a 85° C. constant temperature bath. Nitrogen gas was passed through the solutions, via a sparger, at a constant flow rate.

Because of a severe foaming experienced with the fully calcined ore solution, the gas flow used was one-half of that used for the partially calcined ore solution.

Foaming characteristics of the solutions were determined by periodically measuring the total height of foam plus solution in the graduate over a twenty minute span. At five minute intervals, the gas flow was stopped and water added as necessary to compensate for evaporative losses and readjust the solution volume to 100 ml.

The foaming test results indicated that despite a reduced gas flow rate being used for the fully calcined ore solution, there was still significantly more foaming with the fully calcined ore solution than with the partially calcined ore solution. Foaming test results are presented in the table which follows:

| Time (minutes) | 1 | 3 | 5 | 10 | 15 | 20 |
|---|---|---|---|---|---|---|
| Partial Calcine Volume (ml) | 170 | 176 | 178 | 178 | 171 | 163 |
| Full Calcine Volume (ml) | (not obtained) | 210 | 190 | 187 | 180 | 178 |

The aqueous solution derived from dissolution of the partially calcined nahcolite ore was light tan in color and analyzed as containing 14.3 wt % $Na_2CO_3$ and 10.8 wt % $NaHCO_3$. This solution was then subjected to a batchwise evaporative crystallization by heating to a temperature of 105° C. and at atmospheric pressure.

The sodium carbonate product that crystallized was separated from the mother liquor, washed with methanol and airdried overnight. The white crystalline product produced by the method of this invention was determined to be anhydrous sodium carbonate, assaying as 99.6 wt % $Na_2CO_3$. The crystalline agglomerates had a bulk density measured as 1.068 g/cm$^3$.

By comparison, an aqueous $Na_2CO_3$-containing solution obtained from the dissolution of fully calcined nahcolite ore was light brown in color and analyzed as 28.5 wt % $Na_2CO_3$, with no $NaHCO_3$ being detected.

A batchwise evaporative crystallization of this solution, under conditions similar to that described above, yielded a sodium carbonate product of lesser purity than that of the previously-described crystallization. The crystalline soda ash product was washed and dried as before. This comparative soda ash product was determined to be anhydrous sodium carbonate, but it was of lower purity than the partial calcine soda ash, being light buff colored in appearance and assaying only 96.3 wt % $Na_2CO_3$.

I claim:

1. A method for preparing soda ash from nahcolite ore, which comprises
   (a) partially calcining dry-mined, crushed nahcolite ore to convert at least half, but not all, of its bicarbonate content to carbonate;

(b) dissolving the soluble portion of the calcine in an aqueous solution to form a carbonate-containing solution admixed with ore insolubles;

(c) separating the resultant aqueous solution from the ore insolubles;

(d) crystallizing sodium carbonate, selected from the group consisting of sodium carbonate monohydrate and anhydrous sodium carbonate, at elevated temperature; and (e) recovering the crystallized sodium carbonate from the crystallization slurry.

2. The method of claim 1 wherein the sodium carbonate is crystallized at a temperature above 50° C.

3. The method of claim 1 wherein sodium carbonate monohydrate is crystallized at a temperature of from 50° C. to 109° C.

4. A method for preparing anhydrous sodium carbonate from nahcolite ore, which comprises (a) partially calcining dry-mined, crushed nahcolite ore to convert at least half, but not all, of its bicarbonate content to carbonate;

(b) dissolving the soluble portion of the calcine in an aqueous solution to form a carbonate-containing solution admixed with ore insolubles;

(c) separating the resultant aqueous solution from the ore insolubles;

(d) crystallizing anhydrous sodium carbonate by evaporative removal of water from the separated solution at elevated temperature; and (e) recovering the anhydrous sodium carbonate from the crystallization slurry.

5. The method of claim 1 or 4 wherein the partial calcination is effected at a temperature of from 125° to 200° C., as measured by the spill or exit temperature of the calcine.

6. The method of claim 1 or 4 wherein from 50 to 80% of the nahcolite ore bicarbonate content is calcined to carbonate.

7. The method of claim 1 or 4 wherein the aqueous solution employed to dissolve the calcine is hot, being maintained at a temperature of at least 65° C. up to the solution boiling point.

8. The method of claim 1 or 4 wherein anhydrous sodium carbonate is crystallized by evaporative removal of water at a temperature above about 109° C.

9. The method of claim 1 or 4 which further comprises decarboxylating the residual bicarbonate content of the aqueous $Na_2CO_3$-containing solution, by maintaining the solution at a temperature in excess of 85° C.

10. The method of claim 9 wherein decarboxylation is accomplished concurrently with the dissolution of the calcine and with the crystallization of sodium carbonate.

11. The method of claim 1 or 4 wherein aqueous mother liquor remaining after recovery of the crystallized sodium carbonate is recycled.

12. The method of claim 11 wherein the aqueous mother liquor is recycled to the crystallization step.

13. The method of claim 11 wherein the aqueous mother liquor is recycled as aqueous solution employed in the dissolution of additional nahcolite ore.

* * * * *